United States Patent
Furlong et al.

(10) Patent No.: US 7,672,941 B2
(45) Date of Patent: Mar. 2, 2010

(54) PATTERN MATCHING USING DETERMINISTIC FINITE AUTOMATA AND ORGANIZATION OF SUCH AUTOMATA

(75) Inventors: Peter Furlong, Dublin (IE); Eoghan Stack, Ballyvolane (IE); David John Law, Musselburgh (GB); Hana Hailichova, Dublin (IE)

(73) Assignee: 3Com Corporation, Marlborough, MA (US)

( * ) Notice: Subject to any disclaimer, the term of this patent is extended or adjusted under 35 U.S.C. 154(b) by 431 days.

(21) Appl. No.: 11/064,257

(22) Filed: Feb. 22, 2005

(65) Prior Publication Data

US 2006/0167915 A1 Jul. 27, 2006

(30) Foreign Application Priority Data

Jan. 21, 2005 (GB) .................................. 0501232.3

(51) Int. Cl.
*G06F 17/30* (2006.01)
(52) U.S. Cl. .......................... 707/6; 707/100; 707/200; 375/368
(58) Field of Classification Search ...................... 707/1, 707/6, 100, 200; 709/230; 711/104; 375/368; 370/392
See application file for complete search history.

(56) References Cited

U.S. PATENT DOCUMENTS 4,241,402 A 12/1980 Mayper

| 6,804,316 | B1 * | 10/2004 | Shectman | 375/368 |
| 7,146,643 | B2 * | 12/2006 | Dapp et al. | 726/23 |
| 2003/0065800 | A1 * | 4/2003 | Wyschogrod et al. | 709/230 |
| 2004/0162826 | A1 | 8/2004 | Wyschogrod | |
| 2005/0238022 | A1 * | 10/2005 | Panigrahy | 370/392 |

FOREIGN PATENT DOCUMENTS

WO 03/023548 3/2003

OTHER PUBLICATIONS

Isenman et al., Performing and Architectural Issues for String Matching, 1990, IEEE, pp. 238-250.*
Search Report for GB0501232.3.

* cited by examiner

*Primary Examiner*—Fred I Ehichioya

(57) ABSTRACT

A deterministic finite state machine is operated to detect any one of a plurality of digital signatures each corresponding to a succession of characters and each defined by a sequence of states in the state machine. The machine is organized such that for each state after the first in any sequence there are not more than two allowed exit transitions of which one is to a default state. Input characters are examined to determine a transition from a current state of the machine to a next state. When the machine responds to an input character to perform a transition to the default state, the input character is re-examined to determine the next state of the state machine. The reduction in transitions saves considerable space in memory.

8 Claims, 5 Drawing Sheets

| Current State | Input | Next State | Default State | Pattern detected to this point | State Count |
|---|---|---|---|---|---|
| 0 | a | 1 | 0 | a | 1 |
| 0 | d | 2 | 0 | d | 2 |
| 1 | b | 3 | 0 | ab | 3 |
| 1 |  | 1 | 0 |  | 4 |
| 1 |  | 2 | 0 |  | 5 |
| 2 | e | 4 | 0 | de | 6 |
| 2 |  | 1 | 0 |  | 7 |
| 2 |  | 2 | 0 |  | 8 |
| 3 | c |  | 0 | abc | 9 |
| 3 |  | 1 | 0 |  | 10 |
| 3 |  | 2 | 0 |  | 11 |
| 4 | f |  | 0 | def | 12 |
| 4 |  | 1 | 0 |  | 13 |
| 4 |  | 2 | 0 |  | 14 |
| 5 |  | 1 | 0 |  | 15 |
| 5 |  | 2 | 0 |  | 16 |
| 6 |  | 1 | 0 |  | 17 |
| 6 |  | 2 | 0 |  | 18 |

| Current State | Input | Next State | Default State | Pattern detected to this point | State Count |
|---|---|---|---|---|---|
| 0 | a | 1 | 0 | a | 1 |
| 0 | d | 2 | 0 | d | 2 |
| 1 | b | 3 | 0 | ab | 3 |
| 1 | a | 1 | 0 |  | 4 |
| 1 | d | 2 | 0 |  | 5 |
| 2 | e | 4 | 0 | de | 6 |
| 2 | a | 1 | 0 |  | 7 |
| 2 | d | 2 | 0 |  | 8 |
| 3 | c | 5 | 0 | abc | 9 |
| 3 | a | 1 | 0 |  | 10 |
| 3 | d | 2 | 0 |  | 11 |
| 4 | f | 6 | 0 | def | 12 |
| 4 | a | 1 | 0 |  | 13 |
| 4 | d | 2 | 0 |  | 14 |
| 5 | a | 1 | 0 |  | 15 |
| 5 | d | 2 | 0 |  | 16 |
| 6 | a | 1 | 0 |  | 17 |
| 6 | d | 2 | 0 |  | 18 |

PRIOR ART

| Current State | Input | Next State | Default State | Pattern detected to this point | State Count |
|---|---|---|---|---|---|
| 0 | a | 1 | 0 | a | 1 |
| 0 | d | 2 | 0 | d | 2 |
| 1 | b | 3 | 0 | ab | 3 |
| 2 | e | 4 | 0 | de | 4 |
| 3 | c | 5 | 0 | abc | 5 |
| 4 | f | 5 | 0 | def | 6 |
| 5 | Any Char | 0 | 0 |  | 7 |
| 6 | Any Char | 0 | 0 |  | 8 |

| Current State | Input | Next State | State Count | Comments |
|---|---|---|---|---|
| 0 | a | 1 | 1 | |
| 1 | b | 3 | 2 | |
| 3 | d | 0 | 3 | |
| 0 | d | 2 | 4 | Re-examine the 'd' bit |
| 2 | e | 4 | 5 | |
| 4 | f | 6 | 6 | Match occurs! |

Figure 7
| Current State | Input | Next State | Default State | Pattern detected to this point | State Count |
|---|---|---|---|---|---|
| 0 | a | 1 | 0 | a | 1 |
| 0 | d | 2 | 0 | d | 2 |
| 1 | b | 3 | 0 | ab | 3 |
| 1 | d | 2 | 0 | ad | 4 |
| 2 | e | 4 | 0 | de | 5 |
| 2 | a | 1 | 0 | da | 6 |
| 3 | c | 5 | 0 | abc | 7 |
| 4 | f | 6 | 0 | def | 8 |
| 5 | Any Char | 0 | 0 | | 9 |
| 6 | Any Char | 0 | 0 | | 10 |
Figure 8
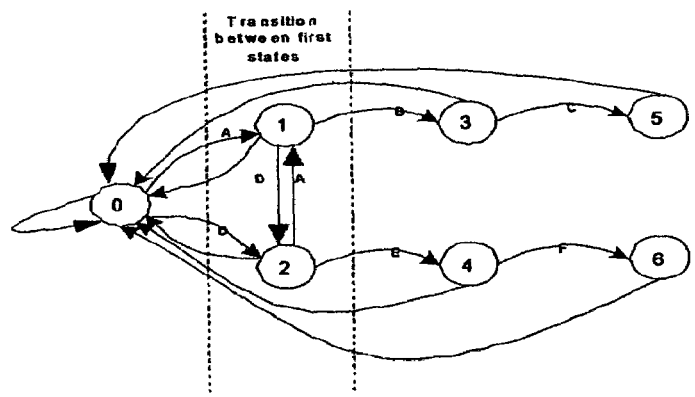
Figure 9
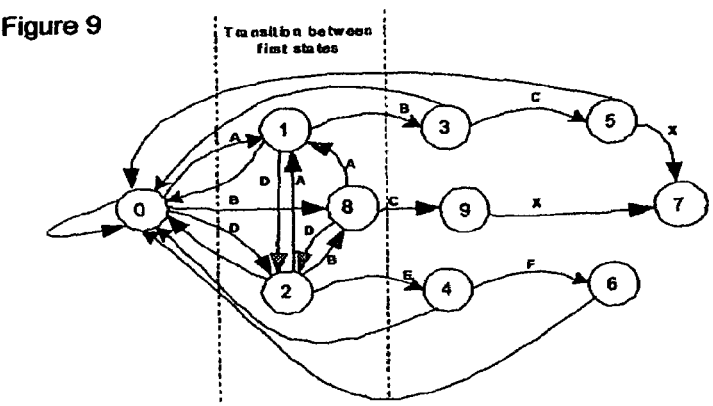

PATTERN MATCHING USING DETERMINISTIC FINITE AUTOMATA AND ORGANIZATION OF SUCH AUTOMATA

FIELD OF THE INVENTION

This invention relates to packet-based communication networks and particularly to the creation and management of a database of patterns or 'signatures' which are associated with or represent a security threat in a network The invention is broadly concerned with the efficient creation and management of deterministic finite state machine tables such as may be implemented on an 'security' ASIC (application specific integrated circuit) that may itself be located within network units such as switches and routers and more particularly concerned with the reduction of memory space required to store the signatures representing threats to the security of the network or the unit.

BACKGROUND TO THE INVENTION

It is known to provide a sizeable database of security threats, represented by patterns or signatures for which a security scanner in a unit connected to a network constantly searches in data streams received or monitored by the unit. It is convenient to store the database of signatures in a memory element, in the form of a table defining a deterministic finite state machine or automaton, usually termed DFA. The number of signatures for which a scanner can search is inherently limited by the size of the memory used to store these signatures. A DFA table is set up by means of a DFA compiler which in accordance with the signatures that are to be detected determines the state sequences and transitions that are to be used to detect those signatures. DFA algorithms for such compilers are known in the art.

In the present context, a 'signature' comprises a sequence of characters. In a typical example, a 'character' may be an ASCII character (of length one byte) and a typical length of a sequence of characters may be several hundred characters. Even so, one of the advantages of the use of a DFA is that the length of the signature does not matter; the operation of the DFA at any stage is dependent only on the current state and the next character.

To detect security threat signatures, particularly in the detection of network intrusion it is desirable to scan every character of every packet's payload to find regular signatures, to discard packets that match or contain a given signature, to generate an alert message to identify which signatures have been matched in a given set and to send an alert message to a log server when a match is detected. It is further desirable to be able to reconfigure the scanner so that it can detect new signatures. The quantity of signatures that require detection continually increases as more threats are identified. A DFA table which stores such signatures and defines transitions between states also needs to increase in size as the number of signatures is increased. As these signatures are kept in memory, the more signatures for which a search is made, the greater the size of the memory required.

It is customary to organize a DFA so that there is a possible next state transition from each of a multiplicity of states in a sequence to a state in at least one other sequence. This is inherently more efficient than a direct return to the default state for all but one character in a respective sequence. However, the occupancy of memory necessary to accommodate all the transitions is very extensive.

SUMMARY OF THE INVENTION

The present invention is particularly concerned with the reconfiguration of a multiple table DFA to enable the size of the table to be compressed. The invention could be used throughout the operation of a DFA but in many circumstances it would be preferable to employ the method according to the invention when a DFA compiler were reaching the limit of its allotted memory using a normal DFA algorithm. The new technique allows either for less off-chip memory or, if the compression is sufficient, for the keeping of the table entirely in an on-chip memory.

As will be explained in detail hereinafter, the technique to be described restricts the transitions between states in different sequences to at most those associated with the first characters in the sequences. This greatly reduces the number of required transitions without suffering the increase in latency that would be associated with transition only to the next state in a sequence and to the default state.

Broadly the invention provides in a preferred form a method of operating a deterministic finite state machine to detect any one of a plurality of signatures each corresponding to a succession of characters and each defined by a sequence of states in the state machine, the method comprising organizing the states of the machine such that for each state after the first in any sequence there are not more than two allowed exit transitions of which one is to a default state; examining a stream of input characters to determine in response to each input character a transition from a current state of the machine to a next state; and, when the machine responds to an input character to perform a transition to the default state, re-examining that input character to determine the next state of the machine.

Transitions may be allowed between the respective first states of at least some of the said sequences. For the last state in any of the sequences there is a single allowed exit transition to the default state.

The re-examination of the current character may be achieved by comparing the current state of the state machine to a null state and on the detection of a match, inhibiting for one cycle an automatically incremented reader, such as for example a read pointer for a FIFO storing the successively received input characters.

Further features of the invention will become apparent from the following description with reference to the drawings.

BRIEF DESERIPTION OF THE DRAWINGS

FIG. 7 is another DFA table for a state machine organized according to the invention FIG. 8 is a state diagram corresponding to the table in FIG. 7.

FIG. 9 is another state diagram showing a modification of the state diagram in FIG. 8.

DETAILED DESCRIPTION

A deterministic finite automaton (DFA) is a state machine comprising a set of states with transitions between the states controlled by the incoming character. Each state in DFA table has in general multiple entries in the table, one entry for each transition from that state.

A typical dual table DFA requires that each state can have a finite number of next states, a default state or any of the first states of the all the patterns in the DFA. The default state is the state in which the DFA begins to process signatures and is also the state to which the DFA jumps if no match occurs on a current input character.

Figures 1, 2:
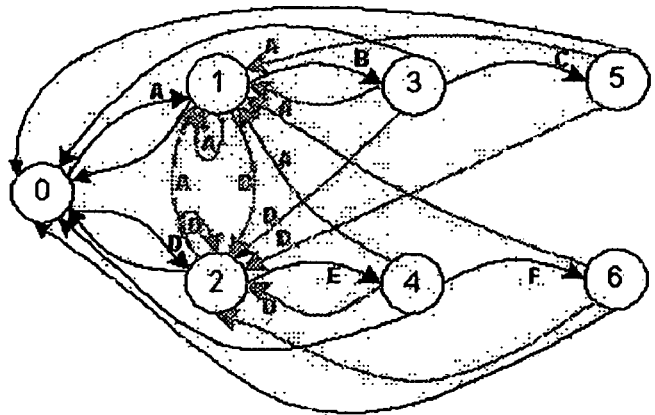
FIG. 1 is an example of a known kind of DFA table.
FIG. 2 illustrates a state diagram corresponding to the table shown in FIG. 1.

In FIG. 1 is shown (for the sake of a comparatively simple example) a dual table DFA for two signatures 'abc' and 'def'. These short signatures are merely illustrative.

In FIG. 1 the current state of the state machine is shown in the leftmost column denoted 'Current State'. The table is organized so that some possible input characters cause the state machine to transition from the current state to a next state in a sequence whereas others will cause the state machine to transition to the default state. A possible input character that can cause the state machine to transition from a state to another (other than the default state) is shown in the second column, denoted 'Input'. The state to which the machine transitions is shown in the third column, denoted 'Next State'. The fourth column indicates a Default State, always state '0' in this example. The fifth column indicates the pattern (if any) which has been detected when the machine has reached the relevant state and the final, rightmost column is the state count.

Thus it may be seen that for a current initial state denoted '0', the machine will transition to the next state 1 if the current input is the character 'a' and will transition to the next state 2 if the current input is the character 'd'. If the machine is in state '1' and the next input character is 'b', the next state is state 3 (see state count line 3) and the pattern which has been detected to this point is 'ab'. Further, if now the next character is 'c', the machine transitions from state 3 to state 5 (see state count line 9) and the pattern of 'abc' has been detected. The same process can be followed through the sequence of states 2, 4 and 6 to detect the pattern 'def'.

More state counts are normally required that would at first sight be necessary for the detection of the two signatures. For example, if the machine has made a transition to state 4 on detection of character 'e' in state 2 and the next character is 'a', the machine should return to state 1, not to the default state 0. This consideration accounts for the state count lines 4, 5, 7, 8, 10, 11 and 13 to 18.

Figures 5, 6:
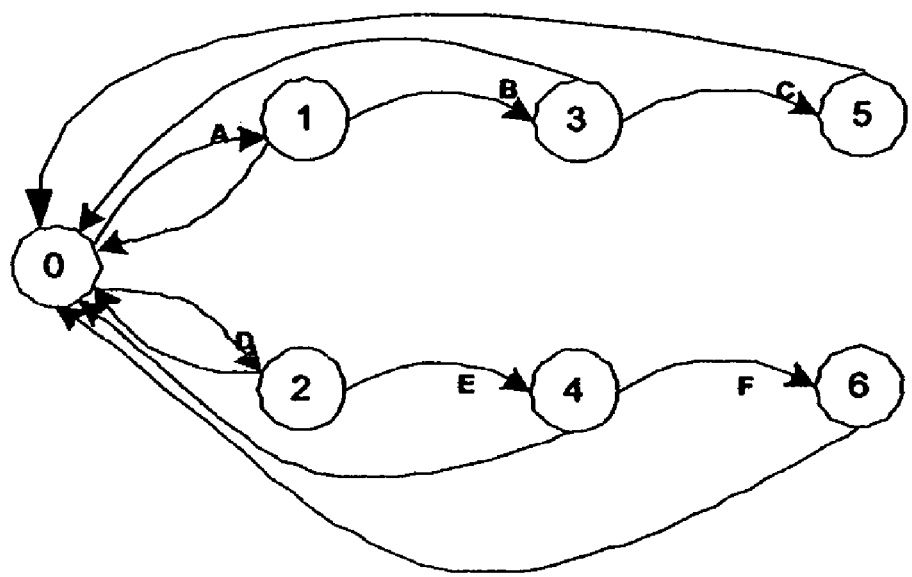
FIG. 5 is a state diagram corresponding to the table in FIG. 4.
FIG. 6 illustrates a progression of DFA states in a search in accordance with the invention.

The significance of the shading in the second column will become apparent from a consideration of FIG. 5. The two states shaded in the second column are states in a sequence to be detected and the two states shaded in the third column represent detected signatures (they are the respective last states in the two sequences).

A state diagram corresponding to the table in FIG. 1 is shown in FIG. 2, wherein the states are shown in the circles and the transitions are shown extending from a current state to the respective next state according the occurrence of the character shown adjacent the respective arrow. The return transitions are shown in feint Such return transition are shown by the arrow denoted D from state 5 to state 2 and the arrow denoted A from state 4 to state 1. Other return transitions go from state 3 to state 1, from state 5 to state 1, from state 6 to states 1 and 2 and so on. There are also reflexive first state references: for example if the machine is in state '1' and the input character is 'A' the machine reverts to state '1'. The state machine in this simple example requires 18 memory locations.

Figures 3, 4:
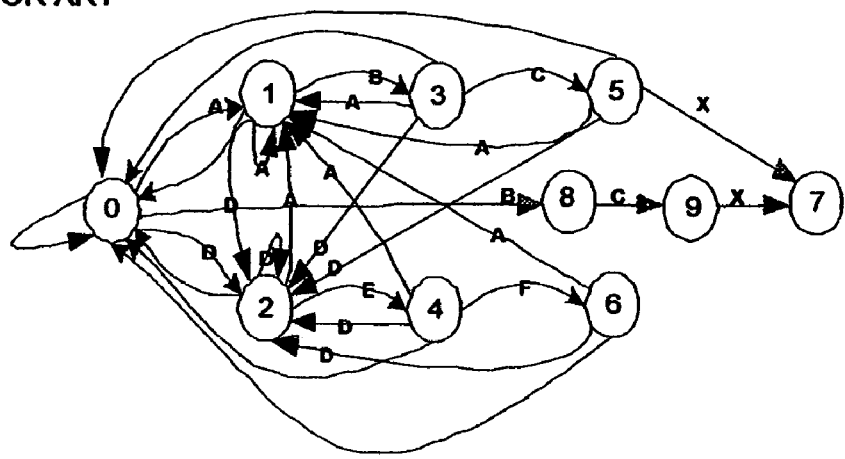
FIG. 3 illustrates a state diagram for an example of known dual table DFA searching
FIG. 4 illustrates a DFA table for a state machine organized according to the invention.

FIG. 3 illustrates the state diagram for a DFA state machine which is searching not only for the signatures 'abc' and 'def' but also for an overlapping signature 'bcx' where x='don't care'. Therefore there exists a branch in the DFA to allow the table to search for the signature 'abcx'. This branch is shown in FIG. 3 by the transition between states 5 and 7. This means that if 'abc' is detected, the signature 'abc' is flagged. But if the signature 'abcx' is then detected it is therefore known that the signature 'bcx' has also been detected. Also if the signature 'bcx' is detected alone, there is also a corresponding branch in the DFA table. This branch is the path defined by states 8, 9 and 7.

The present invention is primarily directed at reducing the number of possible transitions from at least some of the states in the DFA and therefore the number of memory locations required to store the DFA. This may achieved principally by removing transitions to the first states from the same sequences and by removing all references to second and subsequent states in all the sequences. A consequence is that each time there is a return to the default state there should be a re-examination of the character which caused the transition back to the default state.

In the example shown by the table in FIG. 4 and the state diagram in FIG. 5, all the return transitions to non-default states have been removed, there are no transitions between the signatures. The shading in FIG. 4 denotes the final state in respective sequences and the respective patterns detected. In the table there is a maximum of one non-default 'Next State' for each 'Current State'. Thus for non-default states 1,2,3 and 4 there is only one exit transition to a non-default state; for states 5 and 6 there is only a transition to the default state A. Comparison of FIG. 5 with FIG. 2 or FIG. 3 will demonstrate that from a given state (except the default state 0), there is only one entry transition and a maximum of two exit transitions; there may be an exit transition to the next state (if any) state on the same branch and there is an exit transition to the default state 0.

For example, consider state '1' in FIG. 2. There is a respective transition to that state from each of the other five non-default states. In FIG. 5, state 1 can be entered only via a transition from state '0'. The same applies to the other non-default states and so the result is just one entry per state in the table shown in FIG. 4. Therefore the size of the DFA table is significantly reduced, in this example from 18 states to 8. Reverting to FIG. 1, the transitions associated with the states shaded in the second column of FIG. 1 have been eliminated.

During normal operation a DFA state machine will compare the next character in the incoming character stream when it moves to the next state With this technique however, when the state machine detects a jump to the default state (0 in this case), it must recheck the current character as described later.

FIG. 6 illustrates the process of matching using a reduced DFA as shown in FIGS. 4 and 5 for an input stream of characters 'abdef'. The table in FIG. 6 shows the progression of the states of the DFA machine.

The initial state (state count 1) is '0'. The first character detected is 'a', so the machine transitions to state 1. The next character is character 'b', so the machine transitions to state 3.

The next input character is 'd', which is not on the path for this branch; the state machine jumps to the default state '0'. It will be observed that the next character in the sequence is 'e'. In order to be able to detect the possible 'def' signature the character which caused the return to the default state has to be rechecked, denoted by the state count 4 (shown shaded). Since that character was d, the next state is caused to be state 2. If this were not done the next character 'e' would not cause any transition from state '0'. The recheck of the character 'd' causes transition to state 2 and the next character 'e' will cause transition to state 4. Finally character 'f' will cause transition to state 6 in state count 6 and a match for the signature 'def' will have been achieved.

The reduction of transitions described in relation to FIGS. 4 and 5 increases 'latency' every time there is a return to the default state. The worst case for the example given of a DFA table searching for the signatures 'abc' and 'def' would be reception of the pattern 'adadadadad . . . '. This would mean that the default state would occur every second state count.

However the invention further provides a modification which greatly reduces such a potential increase in latency at the cost of only a small increase in memory.

FIG. 7 is a DFA table and FIG. 8 the state diagram for a state machine which is organized to detect a multiplicity of signatures composed of a multiplicity of characters each causing a transition in a respective sequence, wherein the first states only have a transition path between pairs of such first states.

In the example shown in FIGS. 7 and 8, the state 1 is the first state in the sequence of states for the matching of signature 'abc'. The subsequent states in this sequence are states 3 and 5. State 2 is the first state in a sequence for detecting the signature composed of the characters 'def'. Now if the machine is in state '1' there are three possible exit transitions. If the next character is 'b' the machine transitions to state 3, as before. Instead of a return to the default state 0 for any other character (as in FIGS. 4 and 5), there is an exception for character 'd', which will cause transition to state 2, which is the first state in the sequence associated with the signature 'def'.

The DFA table in FIG. 7 differs from that in FIG. 4 by the addition of the transitions shown in the fourth and sixth count lines (both shaded). This modification adds merely two more states to the state count in the DFA table, but the number of memory locations required to hold the same DFA as given in the original example is reduced to 10 from the original 18. This is still a considerable saving. This also illustrates that the algorithm can be optimised to balance table reduction and performance.

In FIG. 7, the shading for count states 7 and 8 indicates the last states in the two sequences and the respective patterns that are thereby detected.

FIG. 9 is a state diagram similar to that shown in FIG. 8 but includes the states for searching for the overlapping signature 'bcx'. It should be compared with the state diagram shown in FIG. 3. By comparison with that earlier diagram, all the intersequence transitions have been removed except those between the first states. Thus for example all the transitions to states 1 and 2 from states 3,4, 5 and 6 have been removed but the transitions between 1 and 2 remain and transitions from state 8 (the first for sequence 'bcx') to states 1 and 2 have been added There is still a considerable reduction of states in the DFA table compared to the original FIG. 3.

It is not necessary to provide an intersequence transition between the first states for every pair of sequences. One may choose to tolerate the latency in favour of a reduction in the required memory space, and of course the limiting case where there is no intersequence transition at all is shown in FIGS. 4 and 5.

The new DFA may be employed on its own but it is preferably employed in conjunction with a DFA compiler and is employed when the compiler detects that it is approaching the limit of a prescribed limit of its allotted memory space when using a normal DFA algorithm.

Figure 11:
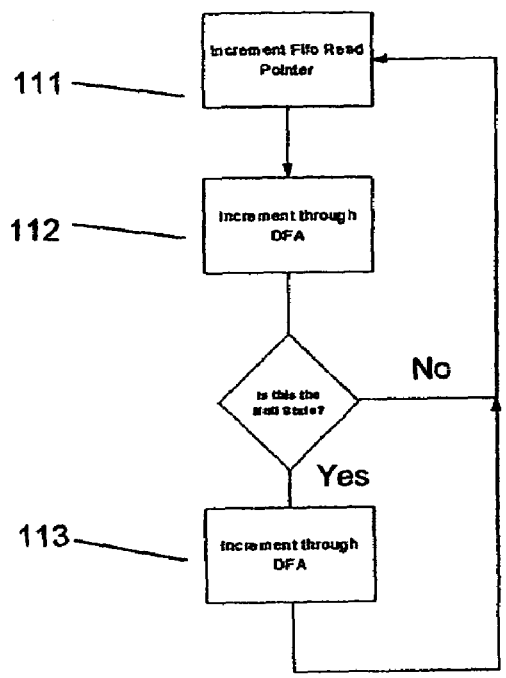
FIG. 11 is a flow diagram of the operation of a DFA according to the invention.
Figure 10:
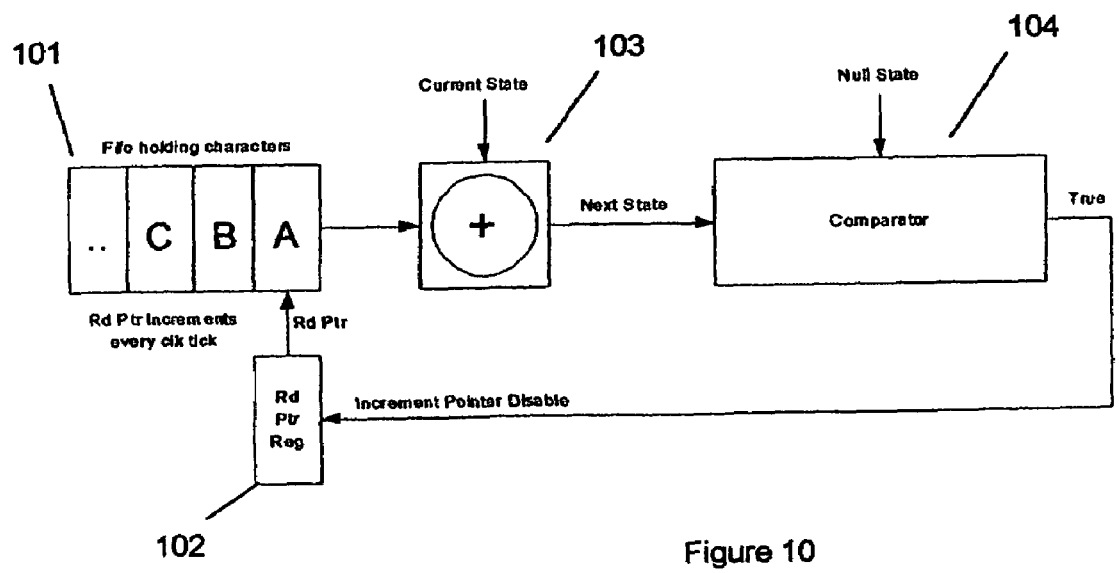
FIG. 10 is a schematic diagram of a DFA according to the invention.

FIG. 10 is a schematic diagram of a DFA according to the invention and FIG. 11 is a flow diagram of the operation of a DFA according to the invention As is shown in FIG. 10, a stream of input characters is stored in a sequentially retrievable manner, in particular in a FIFO 101. The reading of the characters is controlled by a read pointer, of which the value is held in a register 102. Normally the pointer is incremented in each cycle (i.e. every 'clock tick') to read the next character in the FIFO. In the example, the first three characters in the FIFO are A, B and C. In ordinary operation the read pointer would be incremented (stage 111, FIG. 11) and the DFA table would be incremented (stage 112). In other words, the relevant character is used in combination with the current state (as previously described) to determine the next state of the DFA, as shown at 103 in FIG. 10.

The present invention, as noted above, requires suspension of the incrementing of the read pointer if the DFA transitions to the null state. If, as shown in FIG. 11, the state is not null, the default state 0, the FIFO read pointer is incremented normally. If the state is null, the read pointer is not incremented but the DFA is incremented (stage 113, FIG. 11), i.e., the state machine executes the transition prescribed.

To achieve this, the next state obtained by the DFA is compared in a comparator 104 with a value representing the null state. If there is a match, the comparator produces a one cycle inhibit, denoted 'increment pointer disable, which prevents the normal incrementing of the read pointer and thereby causes a re-reading of the current character.

What is claimed is:

1. A method of operating a deterministic finite state machine as implemented in an integrated circuit to detect any one of a plurality of signatures each corresponding to a succession of characters and each defined by a sequence of states in the state machine, the method comprising;

organizing the states of the machine such that for each state after the first in any sequence there are not more than two allowed exit transitions of which one is to a default state;

examining a stream of input characters received from a communications network to determine in response to each input character a transition from a current state of the machine to a next state; and when the machine responds to an input character to perform a transition to the default state, re-examining that input character to determine the next state of the state machine wherein input characters are held in a memory from which they are automatically read by an incrementing reader and the method further comprises comparing the current state of the machine with the default state and on detection of a match inhibiting for one incrementing cycle the incrementing of the reader.

2. A method as in claim 1 wherein transitions are allowed between the respective first states of at least some of said sequences.

3. A method as in claim 1 wherein for the last state in a sequence there is a single allowed exit transition to the default state.

4. An integrated circuit containing a deterministic finite state machine organized to detect any one of a plurality of signatures each corresponding to a succession of characters and each defined by a sequence of states in the state machine, wherein the machine is organized:
- (a) such that for each state after the first in any sequence there are not more than two allowed exit transitions of which one is to a default state;
- (b) to examine a stream of input characters received from a communications network to determine in response to each input character a transition from a current state of the state machine to a next state; and
- (c) when the state machine responds to an input character to perform a transition to said default state, to re-examine that input character to determine the next state of the state machine wherein the finite state machine comprises:

a memory for holding successively received input characters;

an incrementing reader for reading the input characters; and a comparator to compare the current state of the machine with the default state and on detection of a match to inhibit for one incrementing cycle the incrementing of the reader.

5. A deterministic finite state machine as in claim 4 wherein for the last state in a sequence there is a single allowed exit transition to the default state.

6. A deterministic finite state machine as in claim 5 wherein transitions are allowed between the respective first states of at least some of said sequences.

7. An integrated circuit implementing a deterministic finite state machine organized to detect any one of a plurality of signatures each corresponding to a succession of characters, said state machine comprising:

a memory table defining a multiplicity of states and allowed transitions between some of said states, said states defining a multiplicity of state sequences each corresponding to one of said signatures, and wherein for each state after the first in any sequence there are not more than two allowed exit transitions of which one is to a default state;

a memory for holding successively received input characters received from a communications network;

an incrementing reader for reading the input characters to determine in response to each input character a transition from a current state of the state machine to a next state; and a comparator operative, when the state machine responds to an input character to perform a transition to said default state, to compare the current state of the machine with the default state and on detection of a match to inhibit for one incrementing cycle the incrementing of the reader whereby the state machine re-examines that input character to determine the next state of the state machine.

8. A deterministic finite state machine as in claim 7 wherein said memory table allows transitions between the respective first states of at least some of said sequences.

* * * * *